Figures 1, 2:
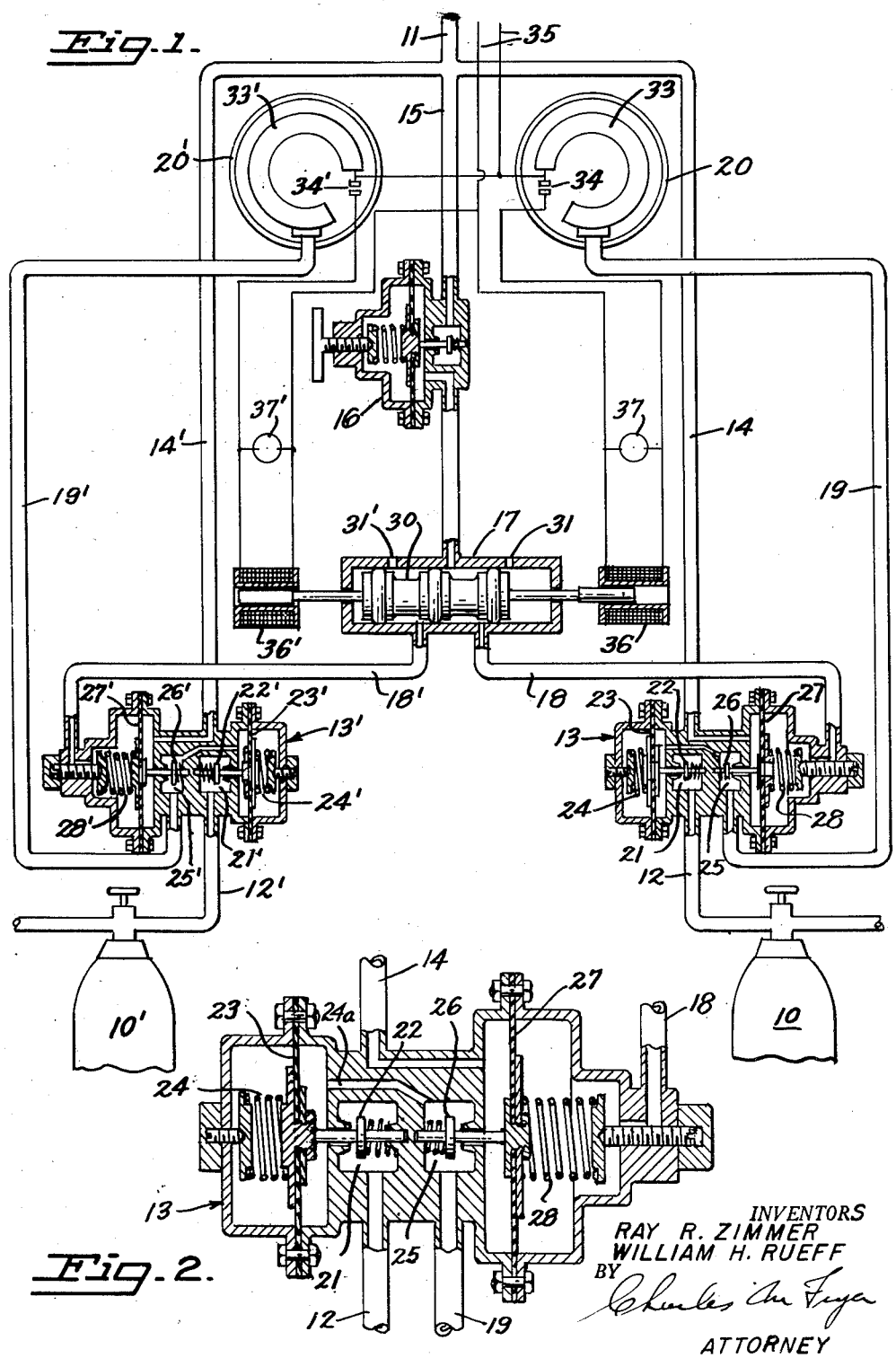

Oct. 30, 1956 — R. R. ZIMMER ET AL — 2,768,640
CONTROL FOR FLUID SUPPLY MANIFOLD
Filed Aug. 18, 1953

INVENTORS
RAY R. ZIMMER
WILLIAM H. RUEFF
BY
ATTORNEY

United States Patent Office 2,768,640
Patented Oct. 30, 1956

2,768,640

CONTROL FOR FLUID SUPPLY MANIFOLD

Ray R. Zimmer, Sausalito, and William H. Rueff, Oakland, Calif., assignors to Victor Equipment Company, San Francisco, Calif., a corporation of Delaware Application August 18, 1953, Serial No. 374,967

6 Claims. (Cl. 137—113)

This invention relates to controls for use with a fluid supply manifold that connects two or more high pressure fluid sources with a common outlet for fluid under controlled pressure. Such systems are commonly used where a second source of fluid is necessary to prevent prolonged failure of fluid delivery when the first source is exhausted. Some examples are where helium or argon gas is used for inert gas arc welding, where oxygen is used clinically and where hydrogen or other gases are employed in connection with glass blowing and various other industrial applications. These gases are often supplied in tank trucks or cylinders under high pressure. Two trucks or two batteries of cylinders are connected with a manifold which in turn connects with a delivery line through pressure regulators.

The two sources are alternately connected with the delivery line and some means is employed to communicate the second source with the delivery line when the first source is exhausted and vice versa.

In many cases any interruption in pressure in the delivery line is time consuming and costly and in some cases, it is dangerous.

It is, therefore, an object of the present invention to provide control means for a fluid supply manifold wherein the pressure from one source is automatically and instantly communicated to the delivery line when the pressure from the other source falls below a predetermined value.

A further object is the provision of such a control means with a signal or warning device to indicate the fact that one source is depleted and in which the only way to correct or change the warning device is to replenish the depleted source.

A still further object of the invention is the provision of control means of the character described operable in part through electrically energized mechanisms but capable of operation automatically by fluid pressure alone in the event of an electric power failure.

Further and more specific objects and advantages of the invention and the manner in which it is carried into practice are made apparent in the following specification by reference to the accompanying drawings.

In the drawings:

Fig. 1 is a schematic view of a control for a fluid supply manifold embodying the present invention, and Fig. 2 is an enlarged sectional view through one of the two-stage pressure regulators employed as parts of the control.

Referring first to Fig. 1 of the drawings, the control mechanism of the present invention is shown in association with a source of fluid under pressure indicated at 10, a second source indicated at 10' and a common delivery line shown at 11. The pressure sources shown at 10 and 10' are illustrated as typical of any suitable source such as a battery of cylindrical gas containers or as in some instances, a tank truck containing fluid under pressure. The delivery line 11 is to be considered as leading to any point or multiple points where gas or fluid under regulated pressure is to be consumed. The two sources 10 and 10' are connected with the delivery line 11 through the manifolding and control mechanism presently to be described. Since many of the parts are duplicated between the two sources and the delivery line, the same reference characters will be used and distinguished by a prime for the parts associated with source 10'.

Referring first to the source 10, it is illustrated as connected by a line 12 to the first stage of a two-stage regulator 13, the construction of which will presently be described in detail. This regulator delivers fluid under reduced pressure through a line 14 to the delivery line 11. A common return line 15 passes through a pressure regulator 16 to deliver gas under relatively low pressure through a spool valve 17 by which it is directed selectively through lines 18 or 18' to the dome of the second stage portion of the regulators 13 and 13' respectively. Lines 19 and 19' connect the intake chambers of the second stage portions of the regulators 13 and 13' with pressure switches 20 and 20' respectively.

The construction of the two-stage regulators is illustrated in Fig. 2 wherein the regulator 13 is shown as having a first stage inlet chamber 21 for reception of fluid under high pressure. A valve 22 controls the flow through said chamber and is urged toward open position by a diaphragn 23 biased by a spring 24 in the first stage regulator dome. Fluid under pressure controlled by the first stage is admitted through a passage 24a to the second stage inlet chamber 25 from which its discharge is controlled by a valve 26 under the influence of a diaphragm 27 and spring 28 in the second dome. The second stage diaphragm 27 is also under certain circumstances influenced by pressure entering the second stage dome through the line 18 and this pressure augments the pressure of the spring 28.

Referring again to Fig. 1, the manner of operation of the control can be described, it being understood that the source of fluid of lowest pressure will be in communication with the delivery line 11 until such time as the pressure therein drops below a predetermined value at which time the alternate source of pressure becomes effective.

Assuming the source of pressure to be about 2000 lbs. and the required delivery line pressure about 50 lbs. and assuming the spool valve 17 to be in the position shown in Fig. 1, the control will operate as follows. Pressure from the source 10 will be reduced by the first stage of the regulator 13 to approximately 75 lbs. before it is admitted to the inlet chamber 25 of the second stage of regulation. The spring 28 in the second stage dome will be set to admit approximately 45 lbs. pressure into the line 14 communicating with the delivery line 11 but the pressure of this spring is augmented by an additional 5 lbs. influence in the second stage dome by way of pressure under control of the regulating valve 16, the construction of which is conventional. The spool valve 17 has spool 30 which, in the position shown, forms a communication between the regulating valve 16 and the second stage dome of regulator 13. In this position, the second stage dome of 13' is vented to atmosphere through the line 18' and a vent 31' in the spool valve housing. When the spool 30 is moved toward the right or to the opposite end of the housing, the line 18 will be vented to atmosphere through a vent 31 and the line 18' will convey pressure from the discharge of the regulating valve 16 to the second stage dome of the regulator 13'.

As long as the pressure in the source 10 remains above a predetermined safe value, say for example 75 lbs., this pressure will be communicated from the second stage inlet chamber of regulator 13 by line 19 to the pressure switch 20. The pressure switch 20 comprises a hollow, resilient, arcuate element 33 tending to contract but maintained in an expanded position by the pressure of fluid within it. An electric switch 34 is open in the expanded condition of the element 33 but when pressure in the element drops below 75 lbs., contraction of the element closes the switch 34 and closes a circuit originating in the lines 35 to energize a solenoid 36. The armature of the solenoid 36 is connected with a spool 30 so that its energization moves the spool to the right reversing the fluid circuit hereinbefore described. Thus the 5 lb. effective pressure controlled by the valve 16 is directed to the second stage dome of the regulator 13' and augments the pressure of the spring therein to open the second stage valve and permit flow of fluid under pressure through line 14' to the delivery line 11. Since the second stage dome of the regulator 13 is now vented to atmosphere, the pressure therein is insufficient to hold valve 26 open and shut off occurs. A fresh supply of fluid under high pressure may be substituted for the exhausted supply in the source 10. Suitable shutoff valves, not shown, may be employed to facilitate the exchange of the source containers whether they be cylinders, tank trucks or other vessels. The electric circuit which energizes the solenoid 36 is duplicated for energization of the solenoid 36' in order to return the spool 30 to its original position, when the source 10' is depleted, and cause delivery of gas from the source 10 which has in the meanwhile been renewed. In Fig. 1, both switches 34 and 34' are shown open because it is assumed that the source of fluid 10' is not depleted. In other words, if it has been depleted to effect closing of switch 34' to move the spool 30 toward the left, it has been replaced with a fresh supply of fluid under pressure. The pressure is communicated to the second stage chamber of the regulator 13' in the manner previously described and from this chamber to the arcuate element 33' to effect opening of the switch 34'.

In parallel with the solenoid 36 and 36' are signals or warning devices shown at 37 and 37'. These warning devices may be in the form of red lights, buzzers or other attention demanding mechanisms and they may be positioned adjacent the remainder of the control mechanism and, if desired, supplementary warning devices in the same circuit may be located in remote positions such as in a superintendent's office or wherever they are most certain to attract attention. In any event, when either one of the warning devices 37 or 37' is energized, it is an indication that the source 10 or 10' has been depleted and with the circuits shown, the warning device will remain energized until the depleted source has been replenished. At this time pressure provided by the source will be communicated to the pressure switch to separate the contact and thereby deenergize the warning device as well as the corresponding solenoid.

The warning system herein described may be made particularly valuable where all of the elements of the control illustrated in Fig. 1 with the exception of the source containers 10 and 10' are enclosed within a locked cabinet so that it becomes impossible for an operator to deenergize the warning device before replenishing the depleted source so that the latter act may be forgotten.

While the system as herein described depends upon electrical energy for its normal operation, a temporary power failure will not prevent the second source from supplying fluid to the delivery line if the first source is depleted during the power failure. For example assuming that the source 10 is depleted during a power failure so that the solenoid and warning devices are ineffective, then the pressure in the line 14 drops and since this pressure is communicated through the line 14' to the diaphragm in the second stage dome of the regulator 13' on the valve side of the dome, this drop in pressure enables the spring to open the valve. Assuming that the values previously used as an example prevail, the spring will cause a flow of fluid under pressure through the line 14' and to the delivery line 11 at 45 lbs. rather than 50 lbs. This is because the spring is not in this case augmented by pressure entering the dome by way of the spool valve. Thus in the event of power failure the control mechanism will operate at a slightly reduced pressure in the delivery line. In such case, it is most probable that the power failure will be detected and the supply at the source 10 will be replenished. Since the valve 17 has not been moved, pressure from the source 10 still exists in the second stage pressure dome of regulating valve 13. Consequently the replenished source 10 will become effective and deliver 50 lbs. while source 10' will again act as a standby source.

We claim:

1. In a control for selectively connecting separate sources of fluid under pressure with a delivery line, a regulating valve associated with each source for reducing the pressure between the source and the delivery line, means to direct limited pressure from the delivery line to the regulating valve of the active source to aid the opening of said regulating valve, and means effective automatically upon a predetermined reduction in pressure at the active source to transfer said aiding pressure to the regulating valve of the other source.

2. In a control for selectively connecting separate sources of fluid under pressure with a delivery line, a regulating valve associated with each source for reducing the pressure between the source and the delivery line, means to direct limited pressure from the delivery line to the regulating valve of the active source to aid the opening of said regulating valve, said means including a selector valve operable to direct said limited pressure selectively to either regulating valve, and means effective upon a predetermined reduction in pressure at the active source to actuate said selector valve.

3. In a control for selectively connecting separate sources of fluid under pressure with a delivery line, a regulating valve associated with each source for reducing the pressure between the source and the delivery line, means to direct limited pressure from the delivery line to the regulating valve of the active source to aid the opening of said regulating valve, said means including a selector valve operable to direct said limited pressure selectively to either regulating valve, solenoid means to actuate the selector valve, a separate pressure switch to control the operation of the solenoid means for moving the selector valve to opposite positions, and fluid connections between each source and one of said pressure switches to effect energization of one solenoid when pressure in the active source falls below a predetermined value.

4. In a control for selectively connecting separate sources of fluid under pressure with a delivery line, a regulating valve associated with each source for reducing the pressure between the source and the delivery line, means to direct limited pressure from the delivery line to the regulating valve of the active source to aid the opening of said regulating valve, said means including a selector valve operable to direct said limited pressure selectively to either regulating valve, solenoid means to actuate the selector valve, a separate pressure switch to control the operation of the solenoid means for moving the selector valve to opposite positions, fluid connections between each source and one of said pressure switches to effect energization of one solenoid when pressure in the active source falls below a predetermined value and signal means energized upon closing of either pressure switch.

5. In combination with a manifold to direct fluid under pressure selectively from different sources to a common delivery line, a two-stage pressure regulator between each source and the delivery line, the second stage of each regulator including a sealed pressure dome with a valve opening spring therein, means to direct limited pressure from the delivery line side of each regulator to its pressure dome to augment the opening pressure of the said spring, and means effective upon reduction in pressure at the active source to discontinue delivery of pressure to its associated regulator dome and direct the pressure to the pressure dome of a regulator associated with another source.

6. In combination with a manifold to direct fluid under pressure selectively from different sources to a common delivery line, a two-stage pressure regulator between each source and the delivery line, the second stage of each regulator including a sealed pressure dome with a valve opening spring therein, means to direct limited pressure from the delivery line side of each regulator to its pressure dome to augment the opening pressure of the said spring, and means effective upon reduction in pressure at the active source to discontinue delivery of pressure to its associated regulator dome and direct the pressure to the pressure dome of a regulator associated with another source, said last named means including an electromagnetically actuated valve and switches for completing circuits to said valve controlled by variations in pressure at said sources.

References Cited in the file of this patent

UNITED STATES PATENTS

| | | |
|---|---|---|
| 1,025,559 | Bliss | May 7, 1912 |
| 1,960,466 | Thrall | May 29, 1934 |
| 2,168,701 | Buttner | Aug. 8, 1939 |
| 2,641,273 | Siebens | June 9, 1953 |